Aug. 29, 1950 N. LAURANTUS 2,520,642
REMOTE CONTROL GATE

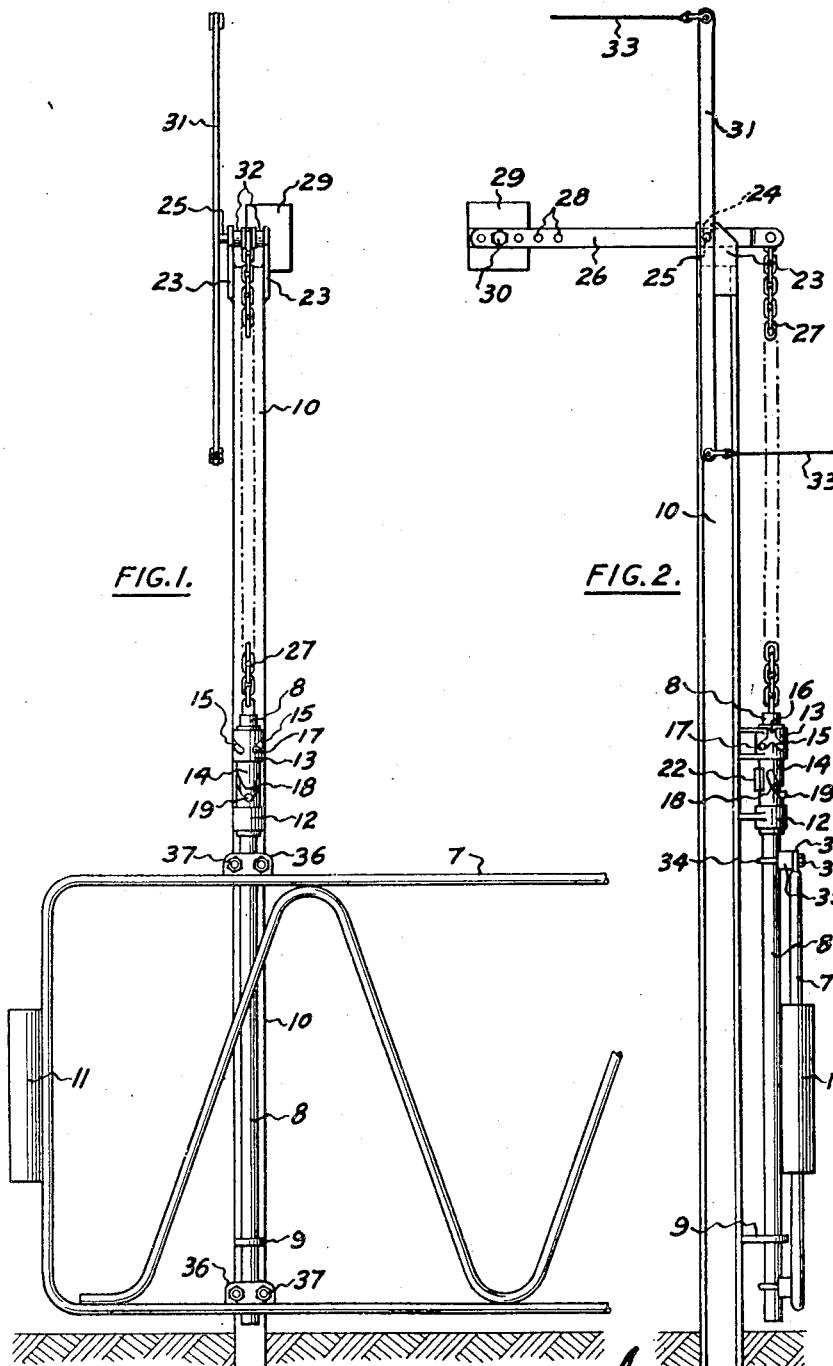

Filed March 20, 1947 2 Sheets-Sheet 2

Inventor:
N. Laurantus
By E. F. Wenderoth
Atty

Patented Aug. 29, 1950

2,520,642

UNITED STATES PATENT OFFICE 2,520,642

REMOTE CONTROL GATE

Nicholas Laurantus, Narrandera, New South Wales, Australia

Application March 20, 1947, Serial No. 735,891
In Australia March 22, 1946

10 Claims. (Cl. 39—31)

1

This invention relates to gates which automatically open or close when simple means such as a rope or lever is pulled at a point remote from and on either side of said gate.

It is an object of this invention to provide improved means in gates of the above described type whereby a gate will alternately open and close for each similar actuation of an operating member.

A further object is to provide an improved gate which will alternately open and close when either one of a rope, handle, lever or the like disposed on either side of and remote from said gate is pulled or actuated similarly.

Another object is to provide improved means in a remotely controlled gate whereby said gate may be opened or closed manually without affecting the normal functioning of the means for opening or closing said gate when actuated from a point remote from said gate.

A still further object is to provide a remotely controlled gate which automatically locks in the open and/or closed positions and unlocks at each actuation of the remote controlling means.

Another object is to provide cam means to effect rotation of a member alternately in opposite directions for successive actuation of said member axially and in one direction.

The invention in a preferred construction of a remotely controlled gate will now be described with reference to the accompanying drawings wherein:

Fig. 1 is a front elevation of portion of a gate and mechanism associated therewith;

Fig. 2 is a side elevation of the gate and mechanism shown in Fig. 1;

Figure 3:
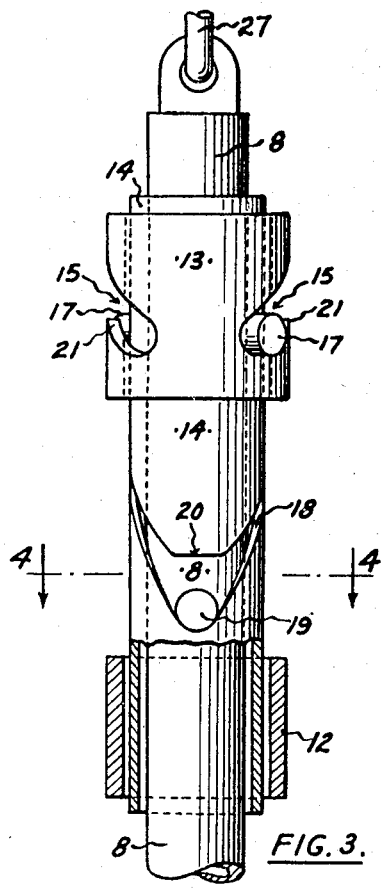
Fig. 3 is an enlarged part sectional elevation of cam means shown in Figs. 1 and 2, said cam means being shown in a normal position.

A gate frame 7 is secured at the top and bottom and a short distance inwardly of one end to a column 8 which is slidably and rotatably supported adjacent its lower end in a bearing bracket 9 secured to a gate post 10 which is a fixture in the ground. The axis of the column 8 defines the pivotal axis of the gate frame 7.

A weight 11 is secured to the end of the gate frame adjacent to the gate post 10 to counterbalance the outer overhanging portion of the gate frame.

A cylindrical guide-bracket 12 and a cylindrical cam bracket 13 spaced above the guide-bracket 12 and co-axial therewith are rigidly secured to the gate post 10 above the gate frame 7.

2

A cylindrical cam sleeve 14 is slidable and rotatable in the brackets 12 and 13 and the column 8 is in turn slidable and rotatable in the cam sleeve 14 and extends slightly thereabove.

The cam-bracket 13 has two inverted V-shaped slots 15, diametrally opposed and each provided with an entry slot 16 at its vertex. The cam sleeve 14 has two diametrally opposed pins or cylindrical projections 17 formed integrally therewith or rigidly secured thereto, and each projection is positioned and is slidable in one of the slots 15. The projections 17 in moving from one extremity to the other of the slots 15, subtend an angle, about the common axis of the cam sleeve 14, cam-bracket 13, guide-bracket 12, and column 8, of 90°.

Another V-shaped slot 18 formed of two opposite hand helices is formed in the cam sleeve 14 and is located between the guide-bracket 12 and the cam bracket 13.

A tapered pin 19, or any other suitable pin, screw, or projection, passes through and is slidable along the slot 18 and is rigidly engaged in or secured to the column 8 in radial disposition. If the column 8 is hollow, as shown, and a tapered pin is employed, the upper end of the column is suitably plugged before forming the hole to receive the pin 19 so as to provide sufficient bearing surface about the pin to retain it in the column 8. The pin 19 in moving from one extremity to the other of the slot 18 subtends, about the common axis of the parts 14, 13, 12 and 8, an angle of 180°.

The slope or lead of the arms of the slot 18 is greater than that of the arms of the slots 15 and the tongue between the arms of the slot 18 is formed with a transverse flat edge 20 at its extremity.

Downward movement of the cam-sleeve 14 is restricted by the projections 17 abutting an extremity of the slots 15 in the fixed cam-bracket 13, and downward movement of the column 8 and gate frame 7 is restricted by the pin 19 abutting the bottom of the slot 18.

The functioning of the cam means will be described particularly with reference to Figs. 3 to 6 inclusive.

Figure 5:
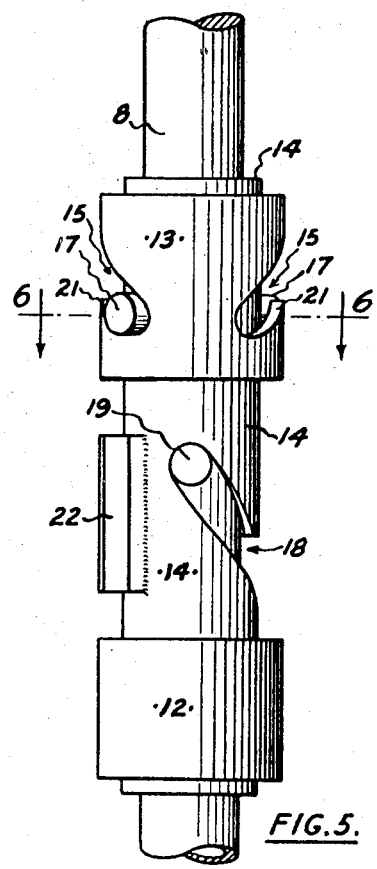
Fig. 5 is an elevation in an actuated position of the cam means shown in Fig. 3.
Figure 4:
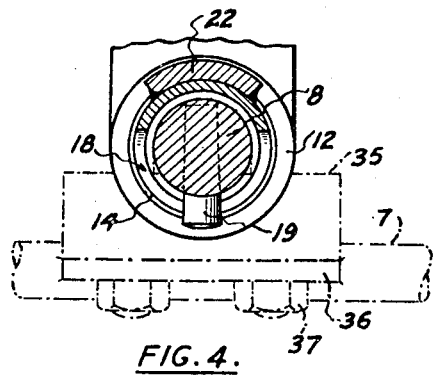
Fig. 4 is a sectional plan taken substantially on the line 4—4 of Fig. 3.

Referring to Fig. 3, when the column 8 is raised, the pin 19 abuts the flat edge 20 of the slot 18 and causes the cam sleeve 14 to be raised with it. The projections 17, being fixed to the cam sleeve 14, then abut the upper edge of the arms of the slots 15 in which they are located and cause the cam sleeve 14 to rotate, thereby directing the pin 19 into the left side arm of the slot 18. The cam sleeve 14 at this stage has rotated 45° and the projections 17 are located on the crests of the tongues 21 formed by the slots 15. Further upward movement of the projections 17 and cam sleeve 14 is prevented by the abutment of a projection 22 secured on the cam sleeve 14 with the fixed cam bracket 13 thereby preventing the entry of the projections 17 into the entry slots 16. The cam sleeve 14, however, is now permitted to fall by continuing to rotate in the same direction as before whereby the projections 17 enter and reach the lower extremities of the other arms of the slots 15 and the pin 19 reaches the upper extremity of the left side arm of the slot 18. This position is illustrated in Fig. 5. During the foregoing movements, the inertia of the gate frame is sufficient to prevent it rotating.

If the column 8 is now released it falls and rotates at the same time by the cam action of the slot 18 on the pin 19 until the pin 19 reaches the bottom of the slot. During this action the column 8 and its attached gate frame 7 rotate through 90° in a direction indicated by the arrow in Fig. 6. It will be noted that in this position the column 8 and cam sleeve 14 have in effect been rotated together through an angle of 90° from the position shown in Fig. 3 so that the projections 17 are located in the cam bracket 13 as shown in Figs. 5 and 6.

When upward movement is again applied to the column 8, a similar but reverse action to that afore-described takes place and the projections 17 and cam sleeve 14 are returned to the positions shown in Fig. 3 with the pin 19 disposed in the upper extremity of the right side arm of the slot 18.

Figure 6:
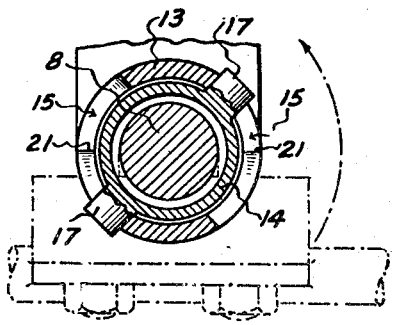
Fig. 6 is a sectional plan taken substantially on the line 6—6 of Fig. 5.

When the column 8 is released, it rotates together with the gate frame 7 through 90° in the reverse direction to that shown in Fig. 6 thereby returning to the original position shown in Fig. 3. Succeeding upward actuations and releasings of the column 8 cause it to be alternately rotated in opposite directions through 90°.

Any convenient means may be employed to lift the column 8 in order to open or close the gate. One way of effecting this movement from a remote point is illustrated in Figs. 1 and 2.

Two plates 23, rigidly secured to and extending above the upper end of the gate post 10, have slots 24 formed in their upper edges to receive a fulcrum pin 25 of, and fixed to, a lever 26. One end of the lever 26 is connected by a chain 27 or by any other suitable actuating means to the upper end of the column 8. A series of holes 28 is formed in the other end of the lever 26 to permit a slotted weight 29 to be secured thereto by a bolt 30 in a position to balance a major portion of the weight of the gate frame 7 and column 8, the unbalanced portion being made sufficient to cause rotation of the gate frame. A double arm lever 31 is rigidly secured at a medial position to one end of the fulcrum pin 25 outwardly of the plates 23 and at right angles to the lever 26. Axial movement of the fulcrum pin 25 is limited by spacing washers 32 (Fig. 1).

Two control cables or ropes 33 are each secured to an end of the lever 31 and extend in opposite directions from the gate post 10 and at right angles to the fence containing the gate.

Two control posts are secured in the ground on opposite sides of the fence and at a convenient distance therefrom whereby the gate may be opened when a vehicle is positioned alongside either of the posts. Each cable or rope 33 may be either secured to a respective control post or passed over a pulley attached to the control post and have a handle or ring attached at its lower end.

A pull on the rope or cable from either side of the fence would cause the column 8 to be raised.

The gate may have a conventional lift latch attached to its outer end which engages a complementary locking plate on the outer gate post. An additional locking plate may be attached to a latch post secured in the ground at a point adjacent to the outer end of the gate frame when the gate is in the opened position. The problem of automatically raising the latch is overcome by the fact that the column 8 and gate frame 7 is initially raised before the gate rotates.

This arrangement prevents the passage of stock through the gate when closed and prevents the gate being blown closed by the wind when open and while a vehicle is passing therethrough.

In practice a vehicle may be driven to a position alongside either control post and the driver or other person in the vehicle, without getting out, then pulls and releases the cable or rope 33 whereupon the gate opens. After passing through the gate, the opposite cable or rope 33 is pulled and released and the gate closes.

If, however, a person on foot intended to pass through the gate, it may be opened in the usual way after raising the latch.

Since the slope of the slot 18 is greater than the slope of the slots 15, the pin 19 causes the cam sleeve 14 to rotate with the gate frame 7 and column 8, the projections 17 riding along the slots 15 according to the rotation of the gate frame 7 and column 8.

If the gate be left in the opened position, the projection 17 will have rotated through 90° and be in the position whereby a pull on either control cable or rope will cause the gate to close. Similarly, if the gate be manually opened and closed, the cam means will be restored to the normal position for opening the gate by either control cable or rope.

The means illustrated for securing the gate-frame 7 to the column 8 permit the gate-frame to be secured from either side and thereby provides for either a left hand opening or a right hand opening gate. These means comprise U-bolts 34, clamping blocks 35, and plates 36.

The clamping blocks 35 are grooved on one side to fit against the column 8 around which each U-bolt is fitted, the ends of each bolt extending through a clamping block and through a plate 36.

The plates 36 are secured as by welding to and at a medial position transversely of the gate frame and the assembly is secured by nuts 37 engaged on each end of the U-bolts 34.

It is pointed out that although one slot 15 is sufficient to cause the required functioning of the mechanism associated therewith, two symmetrically opposed slots 15 are preferred for ease of movement.

I claim:

1. In a gate adapted to open and close by the actuation of remote control means, cam means comprising a cylindrical column, a cylindrical cam sleeve, and a fixed cylindrical cam bracket respectively slidably and rotatably fitted one within the other in vertical disposition, at least one inverted V-shaped slot in said cam bracket, a radial projection on said cam-sleeve slidably fitted in each said inverted V-shaped slot, a V-shaped slot in said cam-sleeve with the tongue formed between the legs of the slot having a flat extremity, and a radial projection on said column slidably fitted in said V-shaped slot in said cam-sleeve, said V-shaped slot in said cam-sleeve being of greater slope than each said inverted V-shaped slot in said cam bracket and the dimensions of said slots being such that said column may rotate relative to said cam-sleeve through an angle at least twice that of the permitted rotation of said cam-sleeve relative to said cam bracket, whereby an upward movement in said column, which is adapted to have a gate frame secured to its lower end, causes rotation of said cam sleeve and downward movement of said column by gravitation causes rotation of said column in one direction and similar and subsequent vertical movements of said column causes said column to alternately rotate in opposite directions.

2. Cam means according to claim 1 wherein said cam bracket has two said inverted V-shaped slots diametrally opposed and each engaged by one of two diametrally opposed radial projections on said cam-sleeve and said cam-sleeve is slidably and rotatably fitted in a fixed guide bracket adjacent to its lower end.

3. Cam means according to claim 2 wherein means are provided to limit axial movement of said cam sleeve.

4. A remote control gate comprising a gate post, a cylindrical cam bracket secured to said gate post and having at least one inverted V-shaped slot formed therein, a cylindrical cam sleeve slidably and rotatably fitted in said cam bracket and having a fixed radial projection slidably engaged in each said inverted V-shaped slot, a V-shaped slot in said cam sleeve subtending an angle at least twice that of each said inverted V-shaped slot about their common axis, a cylindrical column slidably and rotatably fitted in said cam sleeve and having a fixed radial projection slidably engaged in the V-shaped slot in said cam sleeve, a gate frame secured to said column below said cam sleeve and means secured to said gate post and column for raising said column by actuation of control means at a point remote from said gate post, successive raising and lowering movements in said column causing said gate frame to rotate alternately in opposite directions.

5. A remote control gate according to claim 4 wherein the V-shaped slot in said cam sleeve has a slope greater than that of each said inverted V-shaped slot in said cam bracket.

6. A remote control gate according to claim 5 wherein said cam bracket has two inverted V-shaped slots diametrally opposed, and said cam sleeve has two fixed radial projections diametrally opposed and slidably engaged one in each said inverted V-shaped slot, and means to limit axial movement of said sleeve.

7. A remote control gate according to claim 6 wherein said cam sleeve and said column are provided with guide means secured to said gate post.

8. A remote control gate according to claim 7 wherein said means for raising said column comprise a lever fulcrummed on said gate post, a connection between one end of said lever and the upper end of said column, an adjustable weight at the other end of said lever, an arm secured radially thereof and at right angles to said lever and two ropes, cables or the like secured at opposite ends of said arm and extending in opposite directions to points remote from said gate post.

9. A remote control gate according to claim 8 wherein the weight of said gate frame is balanced on either side of said column.

10. A remote control gate according to claim 9 wherein said gate frame is provided at its outer end with automatic locking means disengageable from a fixture by the movement of said gate when actuated by said rope, cable or the like.

NICHOLAS LAURANTUS.

REFERENCES CITED

The following references are of record in the file of this patent:

UNITED STATES PATENTS

| Number | Name | Date |
|---|---|---|
| 608,465 | Lewis | Aug. 2, 1898 |
| 786,440 | Hogan | Apr. 4, 1905 |
| 1,084,733 | Donnell | Jan. 20, 1914 |
| 1,424,913 | Kahler | Aug. 8, 1922 |

FOREIGN PATENTS

| Number | Country | Date |
|---|---|---|
| 65,493 | Sweden | July 3, 1928 |